United States Patent [19]

Gibson, Jr.

[11] Patent Number: 5,305,591
[45] Date of Patent: Apr. 26, 1994

[54] RAKING IMPLEMENT WITH INTEGRAL TINE CLEANER

[76] Inventor: Herbert M. Gibson, Jr., 565 E. Indiana Ave., Southern Pines, N.C. 28387

[21] Appl. No.: 926,396

[22] Filed: Aug. 10, 1992

[51] Int. Cl.⁵ .............................................. A01D 7/04
[52] U.S. Cl. .................................. 56/400.1; 56/400.08
[58] Field of Search .............. 56/400.08, 400.1, 400.19

[56] References Cited

U.S. PATENT DOCUMENTS

| | | | |
|---|---|---|---|
| 1,131,553 | 3/1915 | Rethorn | 56/400.1 |
| 1,244,789 | 10/1917 | Stetson | 56/400.19 X |
| 1,864,264 | 6/1932 | Velkover | 56/400.1 |
| 4,850,185 | 7/1989 | Dimon | 56/400.1 |

FOREIGN PATENT DOCUMENTS 541921  5/1922  France .............................. 56/400.1

*Primary Examiner*—Mark Rosenbaum
*Assistant Examiner*—Frances Han

[57] ABSTRACT

A hand held implement for raking is provided with an apparatus for cleaning of debris which becomes lodged on and among the tines by means of an actuator, requiring a minimum of effort and disruption of the raking rhythm on the part of the operator in order to effect cleaning. The tines are transversely flexible, allowing the movement of a cleaning bar, which also serves as a stress distributor and tine separator, along and about and to the distal ends of the tines for the purpose of removing lodged debris. The cleaning bar is attached to and operated by a hollow actuator, which moves along and about the rake handle, by an intervening spring, which applies downward tension to the tines. The tines, in turn diverging and downward arcing, provide tension to help keep the cleaning apparatus as positioned by the operator anywhere along its travel upon the tines. The cleaning apparatus is further kept at the proximal end of its travel by the raking motion of the operator and is activated by rotation of the lower arm about the elbow without requiring a change of grip by either hand of the operator.

10 Claims, 12 Drawing Sheets

RAKING IMPLEMENT WITH INTEGRAL TINE CLEANER

BACKGROUND OF THE INVENTION

A. Field of the Invention

This invention relates to a lawn or leaf rake, more particularly to a rake which can be cleaned of leaves which become lodged on the tines during the raking process, by operation of an integral actuating handle without the need for shifting of the operator's hands from the position customarily used in raking. The invention embodies significant improvements in simplicity of design and economy of construction over the existing state of the art of self cleaning rakes.

B. Description of the Prior Art

The art of self-cleaning rakes is documented from the early years of the U.S. Patent Office. However, prior to the most recent patents, "Hand rakes with cleaner", that is prior to U.S. Pat. No. 2,705,394, practically all of the prior patents pertain to garden rakes, those with rigid tines set at right angles to the handle, as differentiated from lawn or broom rakes with flexible tines, which are generally longer, more slender, and in the same general plane as that of the rake handle.

This flexible aspect of the lawn rake tines presents additional and unique circumstances which must be addressed in the design of a self cleaning apparatus for such rakes. These circumstances are further compounded by the predominant radial tine placement or fan shape of most broom rakes and the convention of including a downward bent section at the end of each tine to enhance leaf gathering efficiency.

U.S. Pat. Nos. 3,884,023 and 4,850,185, in addition to one other recent patent for self-cleaning leaf rake, U.S. Pat. No. 4,776,158, address these problems in different ways. All three accept the existence of the downward angled tines, and their arts embody means of dealing with the problem of moving a cleaning device past the angled crooks to reach the very end of the tines in order to effect thorough removal of lodged debris. The instant invention substitutes gradually downward arcing tines of flexible material to enhance the leaf gathering capacity of the rake normally accomplished by the angled ends of most tines. The existence of a gradual arc as opposed to an abrupt crook in the tines allows a simpler cleaning device to be moved along the tines in conjunction with a more direct actuating mechanism.

U.S. Pat. No. 3,884,023 utilizes a cleaning apparatus with actuating linkage (including handle) involving 7 sections or parts comprising at least 10 separate pieces plus fasteners. The apparatus as taught involves an estimated 11 steps in the assembly of the separate pieces, (not including the tine/head subassembly), in addition to special preparation of the handle with a groove to accept the actuating linkage. The construction of the tines and tine head assembly is not taught in full detail.

U.S. Pat. No. 4,776,158 is not of fan or radial shape tine placement, as is the instant invention, having instead a rectangular shape with parallel tines. Such shape tends to be less manageable in some raking circumstances than the more customary fan shape. This patent and U.S. Pat. No. 4,850,185 is otherwise distinguished from the instant invention by the existence of a separate handle for the actuating mechanism requiring release of the down side hand of the operator from its customary position on the rake handle during raking in order to grasp the actuator handle to effect cleaning. With the instant invention, it is not necessary to release or reposition the hand in order to effect cleaning.

U.S. Pat. No. 4,850,185 maintains a stationery cleaning apparatus attached to the handle and effects removal of debris by withdrawing the tine assembly into the cleaner by an actuator linkage attached to a lever handle. Other than the tine/head subassembly, which is not taught in detail, there are 8 pieces plus fasteners in the handle/cleaner and actuating linkage, including the tension spring and tine spreader, which require an estimated 9 assembly steps.

In addition to rakes classified as self cleaning, there are a number of patents that relate to adjustable, collapsible, or retractable rakes. These are of a broom or lawn rake variety and have similarities of mechanism with this and some of the prior self cleaning rake inventions. U.S. Pat. No. 2,149,429 includes a guide bar that moves to the distal end of the rake tines. It does not, however, move to the very end of the crooked tines, as does the mechanism in U.S. Pat. No. 3,884,023 or in the instant rake, making it ineffective in cleaning. The same lack of movement to the very ends of the tines makes the adjustable or collapsible rakes taught in U.S. Pat. Nos. 3,727,389, 3,701,243, and 4,901,515 ineffective in cleaning. In addition, all four of the above incorporate a catch or locking mechanism which must be operated in order to move the spreader bar along the tines. This intervening mechanism is not required in U.S. Pat. No. 3,884,203 or in the instant invention.

U.S. Pat. No. 4,236,742 relates to a retractable rake for use as a portable golf rake or for light raking chores. This rake has a hollow shaft, flared into a rake head at one end to enable a plurality of tines to be retracted into the head. The tines are locked into position in both their open and retracted position, by means of a leaf spring and button arrangement, thus requiring operation of the button in order to retract the tines. This invention, as taught, is not designed for general lawn usage. In addition, the rake does not incorporate as economical a use of materials or ease of manufacture or use as does the instant invention.

The lack of wide spread commercialization of existing designs for a function whose utility is readily recognized by anyone familiar with leaf raking suggests the restrictive manufacturing costs and/or lack of operational ease of use and effectiveness of the existing designs. The instant invention utilizes a cleaning apparatus with actuating linkage (including handle) involving 4 sections or parts comprising 4 separate pieces plus fasteners, in its spring steel version and 2 parts comprising 2 separate pieces, in its molded plastic version. Manufacturing steps are necessarily reduced in both cases, with an estimated 5 steps for the spring steel version and 3 steps for the molded plastic version. Operation of the cleaning mechanism requires only one small movement of the operator's lower arm, pivoting at the elbow, without appreciable disruption of the raking rhythm.

SUMMARY OF THE INVENTION

The instant invention is a hand held, manually operated lawn rake of radial curved tine placement design which incorporates a movable spreader/stress distribution bar for removing lodged debris from the tines by action of an integral, sliding handle, which can be operated without necessitating release of the operator's grips as positioned in the normal act of raking.

In the preferred embodiments the tines of the rake, being of spring steel or plastic, are flat and radiate outward from the rake head, where they are fastened together, flat surface to flat surface, and join thereby to the rake handle. The tines are twisted 90 degrees, partway along their length, after which they bend downward in a gradual arc to the distal end. This twist, which is customary in many spring steel rake designs, allows the tines to be compressed together along their proximal sections as the cleaning bar is moved toward the distal end.

The tines are separated by a slotted cleaning bar which acts to spread the tines as well as to distribute and absorb the stress delivered to the tines by the ground and other objects during the act of raking. The bar is attached by a double coil spring to the end of a hollow cylindrical handle section that has its bottom and a major portion of its sides removed on the lower end to allow movement over the rake head. The coil spring absorbs impact from the ground through the tines and cleaning bar and aids in following the contour of the tines during the act of cleaning. The hollow handle section of fiberglass or plastic encompasses a narrowed shaft of an inner handle which is attached to the rake head.

In the molded plastic version, the handle, spring, and cleaning bar assembly are replaced with a single molded, resilient plastic piece. The cleaning action of the apparatus is effected by moving the hollow handle along its longitudinal axis in the direction of the rake tines and returning it to the original position to continue raking.

The object of the invention is to provide a lawn rake with an integral apparatus for cleaning lodged leaves and other debris from the rake tines with the least possible lost motion or disruption of the raking rhythm of the operator. A further object of the invention is to accomplish this in a more economical way than is now possible given the present state of the art, in order to make the rake with cleaning apparatus more price competitive with conventional, non cleaning rakes, thereby making the time saving benefits of the technology available to a greater population. To this end, this invention entails one additional part for a plastic embodiment and one additional part plus fasteners for a spring steel embodiment over and above existing designs for conventional, non cleaning, fan shaped rakes of corresponding construction. Other objects and advantages will become apparent and obvious from a study of the following description and the accompanying drawings which are merely illustrative of such invention.

DETAILED DESCRIPTION OF THE INVENTION

In the following detailed description of the invention, "down" and "downward" refer to the direction of the ground relative to the rake as it is positioned during the customary act of lawn raking. "Bottom" refers to that portion along the longitudinal axis of the rake that faces the ground during the customary act of raking, while "top" refers to that portion along said longitudinal axis that faces away from the ground during raking. "Distal" refers to the direction or part of a referenced object closest to the ground and hence distant from the operator during raking, and "proximal" refers to the direction or part of a referenced object closest to and hence in proximity to the operator.

Figure 1:
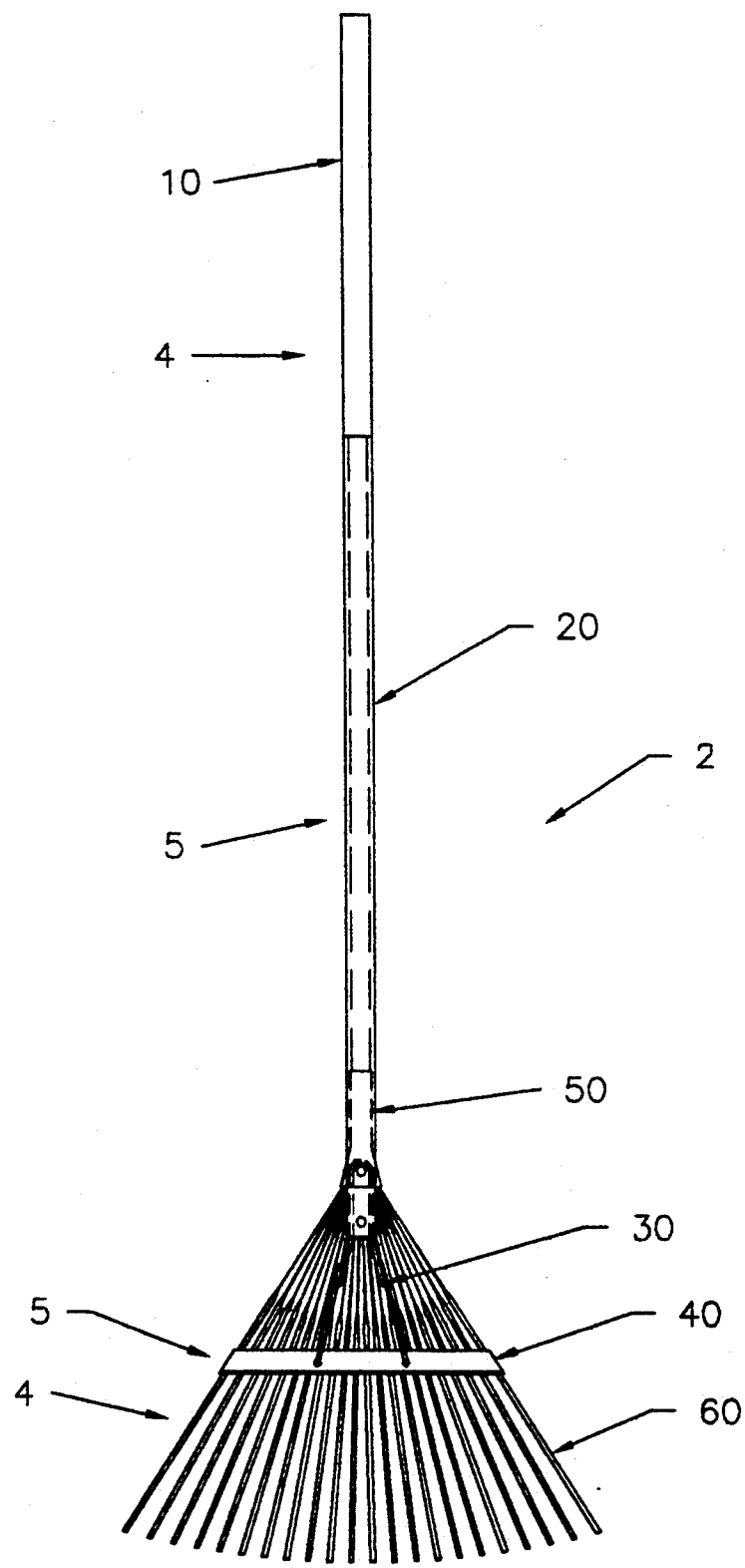
FIG. 1 is a top view of the lawn rake with the cleaning apparatus in the customary position for raking.
Figure 2:
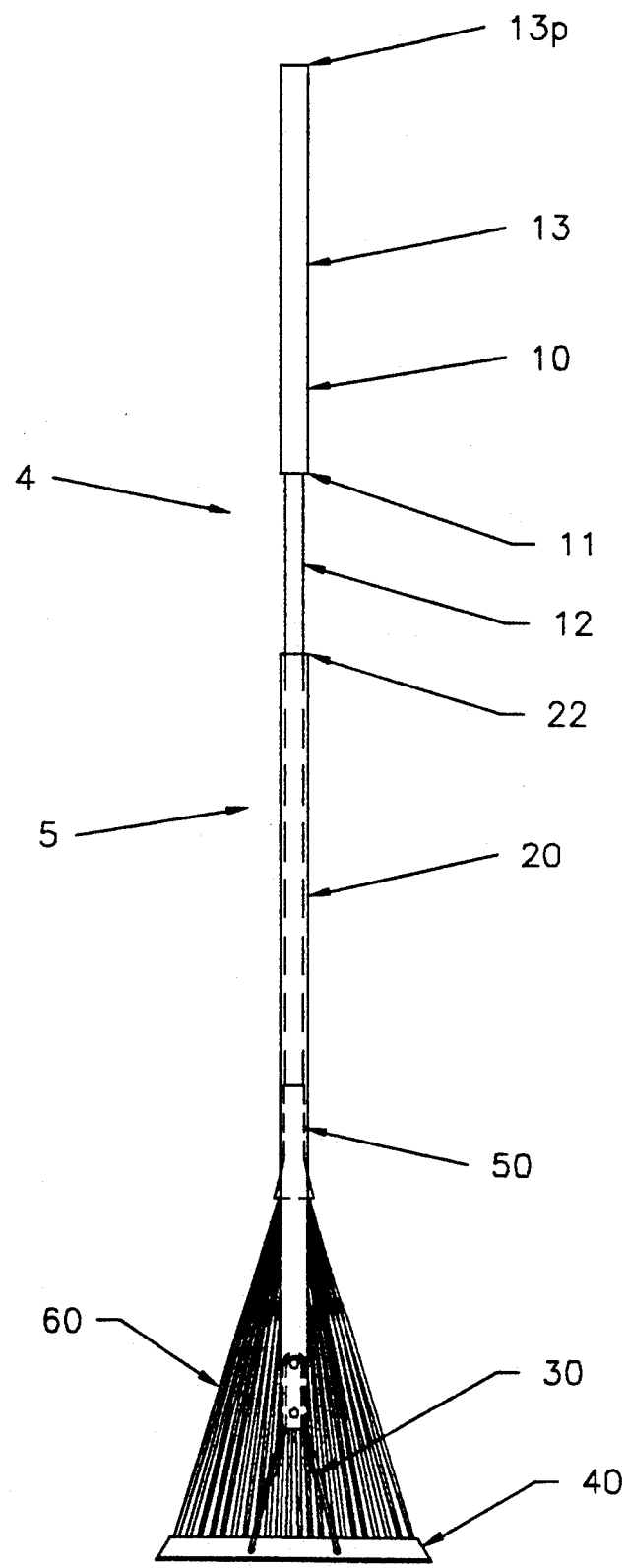
FIG. 2 is a top view of the lawn rake with the cleaning apparatus fully extended as in the act of cleaning.

Referring to FIGS. 1 and 2, there is illustrated the preferred embodiment of the instant invention. A rake is generally designated at 2 and is comprising two main parts, a raking apparatus 4, comprising a handle 10, attached to a plurality of tines 60, by way of a rake head 50, said raking apparatus supporting a cleaning apparatus 5 comprising a hollow actuator 20, which is attached to a cleaning bar 40, also acting as a stress distributor and tine spreader, by way of a coil spring 30. FIG. 1 illustrates the rake 2 in the customary condition of raking. FIG. 2 illustrates the rake in the condition of full extension of the cleaning apparatus 5 for cleaning.

The handle 10 of said rake 2 is of an elongated cylindrical shape of such diameter as to easily slide within the hollow actuator 20 without excessive diametric motion. In an alternate embodiment, the upper, or proximal, section 13 of the handle 10 is of larger cross sectional diameter than the lower, or distal, section 12, the abrupt transition in diameters occurring at the actuator stop 11.

Figure 3:
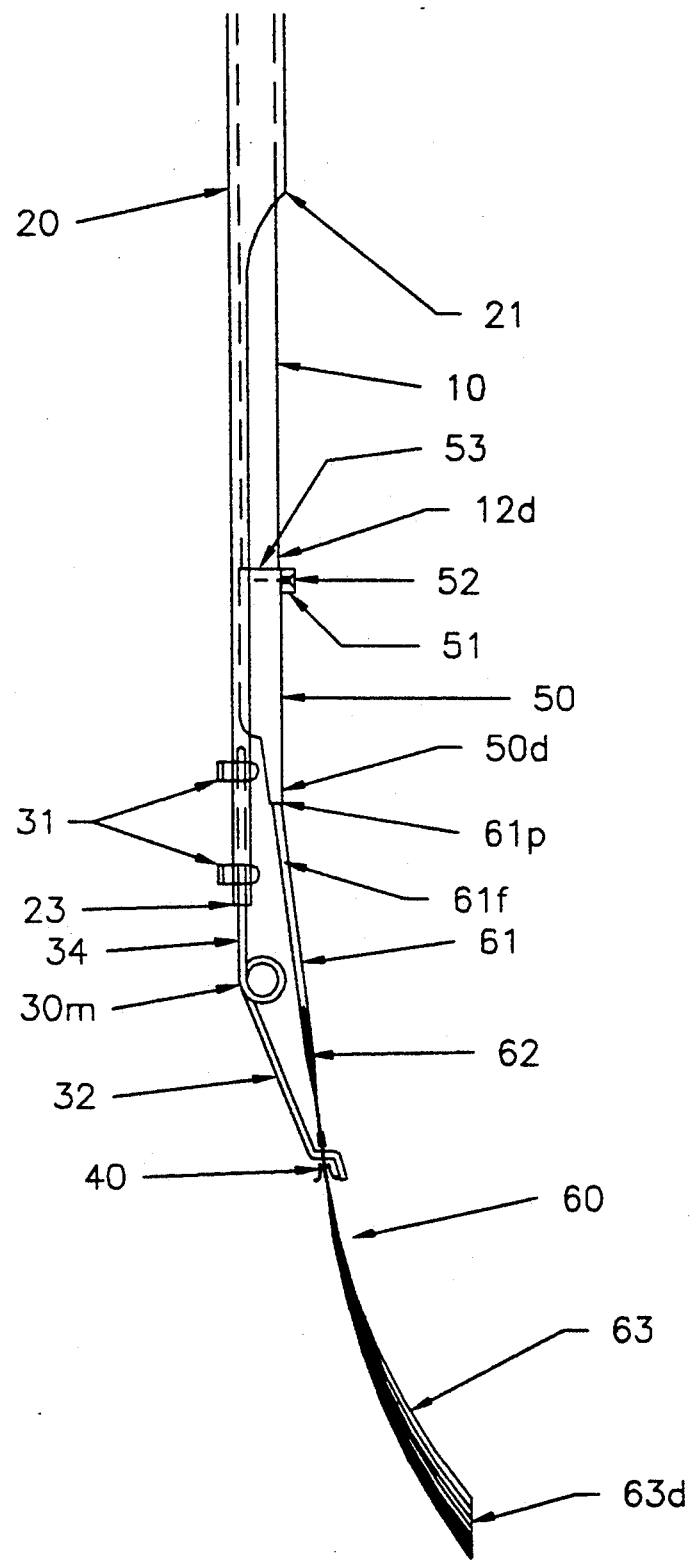
FIG. 3 is a side view of the rake head and cleaning apparatus.

As shown by FIG. 3, the distal end 12d of the handle 10, after passing longitudinally through the hollow actuator 20, is inserted into a formed cylindrical socket 53 of the rake head 50 and is secured by a fastener 52 which also holds a bumper 51. The bumper 51 serves as a stop against which the bottom distal end of the actuator 21 comes to rest at the distal end of its travel during the cleaning cycle. In an alternate embodiment, a two way bumper 55 is attached to the distal section of the handle 10 so that an elongated slot 56 formed in the hollow actuator 20 and positioned around the two way bumper can arrest the motion of the actuator 20 at each end of its travel along and about the handle 10, the longitudinal axis of the slot being parallel to the longitudinal axis of the actuator.

Figure 4:
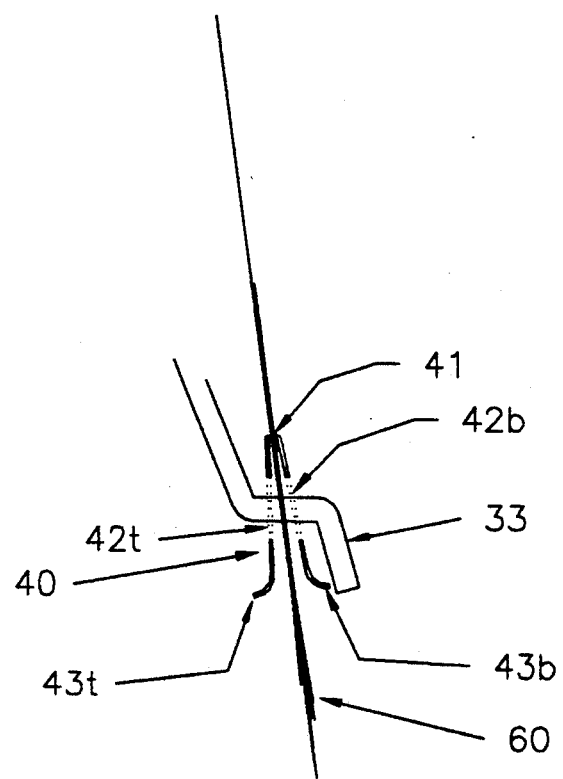
FIG. 4 is a detail of the spreader bar.

A plurality of spring steel tines 60 are gathered at their proximal ends 61p with their flat surfaces 61f of said ends sequentially joined in parallel and bound in the distal end 50d of the rake head 50. The rake tines 60 extend in planes, divergent and perpendicular to the top plane of the rake, to a point partway along their length 62, equidistant from the rake head distal end 50d for each tine, where they are twisted 90 degrees about their longitudinal axes. This can also be seen from the top in FIG. 5. From this point 62 they extend coplanar, passing individually through a plurality of slots 41 in the cleaning bar 40, seen in FIG. 4, from whence they are shaped individually in gradual arcs toward the bottom side of the rake 2 terminating in a common plane at the distal ends 63d. The individual tines 60 are of such length that when the cleaning bar 40 is extended to the distal end of the tines 63d by operation of the actuator 20, all tines terminate at the plane formed between top edge 43t and bottom edge 43b of the cleaning bar, seen in cross-sectional detail in FIG. 4. This construction results in a gentle arc to the distal section of the rake tines 60 when the cleaning apparatus 5 is in the raking position.

Figure 6:
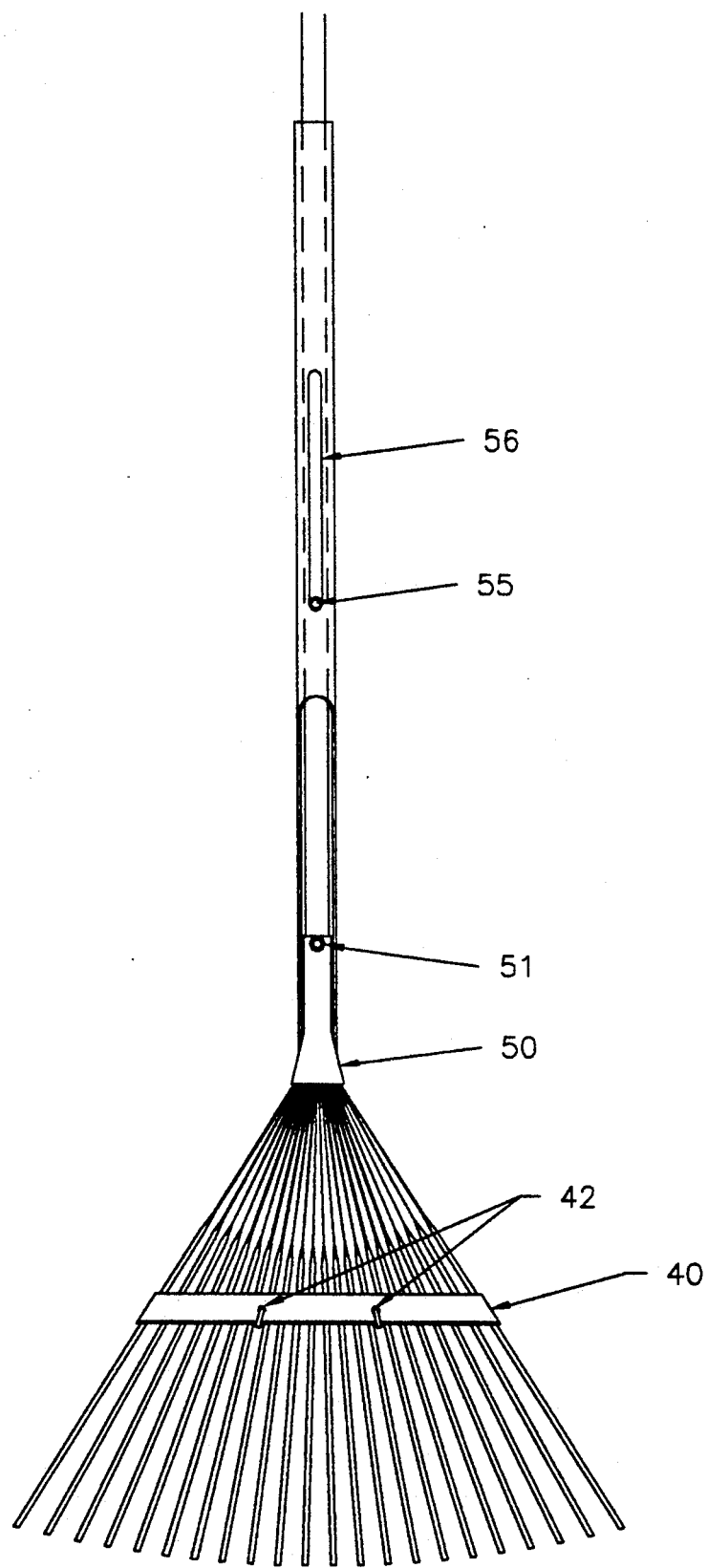
FIG. 6 is an enlarged bottom view of the lawn rake with the cleaning apparatus in the customary position for raking.

In the preferred embodiment the cleaning apparatus 5 is comprising an actuator 20 attached to a coil spring 30 which supports the cleaning bar 40. Said actuator is a hollow cylinder with the bottom distal portion removed to allow said actuator to be slid along the handle distal section 12 and over the rake head 50. FIGS. 3 and 6 show the actuator 20 as assembled with the bottom distal portion removed at a point 21 such that the distal extension of the cleaning apparatus 5 is arrested by said point 21 coming in contact with the bumper 51 coincident with the cleaning bar top edge 43t and bottom edge 43b becoming coplanar with the distal tine ends 63d.

Figure 5:
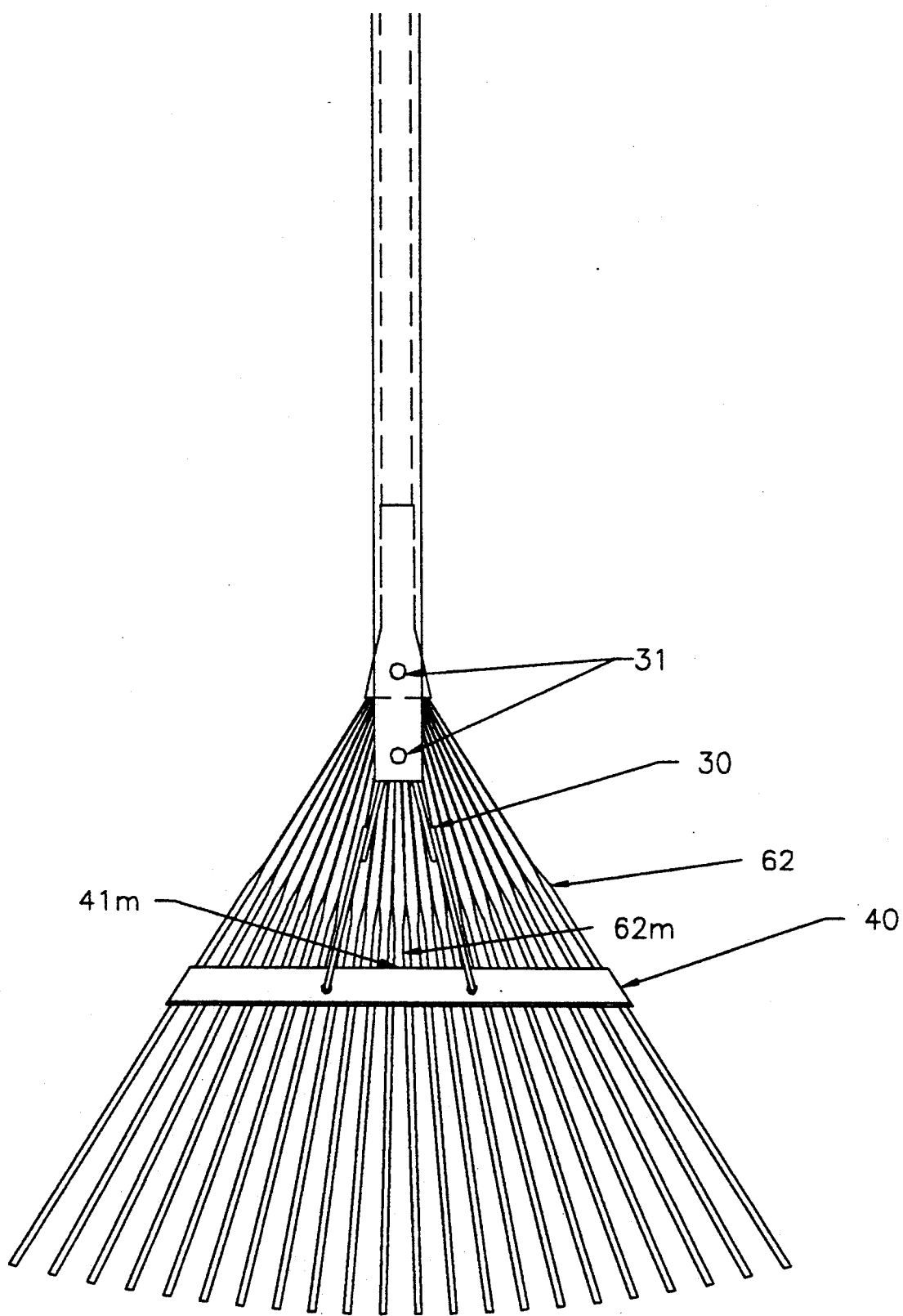
FIG. 5 is an enlarged top view of the rake head and tines and cleaning apparatus.

As seen in FIG. 3 and FIG. 5, the top distal end of the actuator 23 is attached to the proximal end of the double coil spring 30 by two mechanical fasteners 31 that maintain longitudinal alignment of the coil spring 30 with the longitudinal axis of the actuator 20, in addition to firmly fixing said coil spring to said actuator against the stress of extending the cleaning apparatus against debris lodged in the tines 60. The proximal section of the coil spring 34 is nested into the concave section of the top distal end of the actuator 23 by the mechanical fasteners 31 and extends parallel with the top plane of the actuator 20 with each of two prongs diverging upon emergence from the actuator 20 until coiling in excess of 360 degrees 30m thereafter extending in a downward slanting plane to the cleaning bar 40. Each side of the distal end of the coil spring 32 terminates in a "Z" shaped bend 33 which holds the coil spring 30 in place after said coil is inserted in each of the two holes punched into the top and bottom sides of the cleaning bar 42t and 42b. The middle section of the "Z" shapes 33 transfers the longitudinal motion of the actuator 20 to the cleaning bar 40 to move said bar along the rake tines 60.

As mentioned above, the cleaning apparatus 5 is limited in its longitudinal motion with respect to the rake handle 10 by the bumper 51 at the distal end of its travel. The cleaning apparatus is limited in its longitudinal motion with respect to the rake handle at the proximal end of its travel by contact of the middle section of the plurality of slots 41m in the cleaning bar against the twists 62m in the middle section of the plurality of tines. In an alternate embodiment, the cleaning apparatus is limited at the proximal end of its travel by the actuator stop 11. In another alternate embodiment, it is stopped at both ends of its travel by a two way bumper positioned within an elongated slot in the hollow actuator. The transverse motion of the distal end of the cleaning apparatus 5 is limited by the alignment and rigid attachment of the coil spring 30 with the actuator 20 and the triangulation of the two sides of said coil spring and the cleaning bar 40. In an alternate embodiment the actuator 20 and the mechanism of the coil spring 30 are made of one piece molded plastic. In yet another alternate embodiment, the entire cleaning apparatus 5 is made of one piece molded plastic.

The cleaning apparatus is constructed so that it is extended toward the distal end of the rake, tension latent in the mechanism is released causing the cleaning bar 40 to move slightly in the direction of the bottom side of the rake. As said cleaning apparatus is returned to the proximal end, the downward cant of the proximal section of the tines 61 from the plane of the top of the rake 2 and the orientation of said proximal section tine faces perpendicular to said top introduces tension into the cleaning apparatus 5, maintaining a positive pressure between the top side of the tines and the cleaning bar and allowing it to serve as a stress distribution bar while raking.

The radial divergence of the tines 60 is constructed so that latent transverse tension is introduced in them by the cleaning bar 40 as it is extended toward the distal end. Of further note, the twist 62 allows the tines to be brought in closer proximity to each other than would be possible if they were coplanar along their entire length from the rake head 50 as in some designs. As the cleaning apparatus 5 is returned to its proximal position, the release of said transverse tension aids in keeping the apparatus in this proximal position during raking. The cleaning apparatus is further kept in its proximal position during the act of raking by the raking action of the operator, specifically by the natural reliance of the operator on the downward arm as the primary contributor of pulling force during raking.

Figure 7:
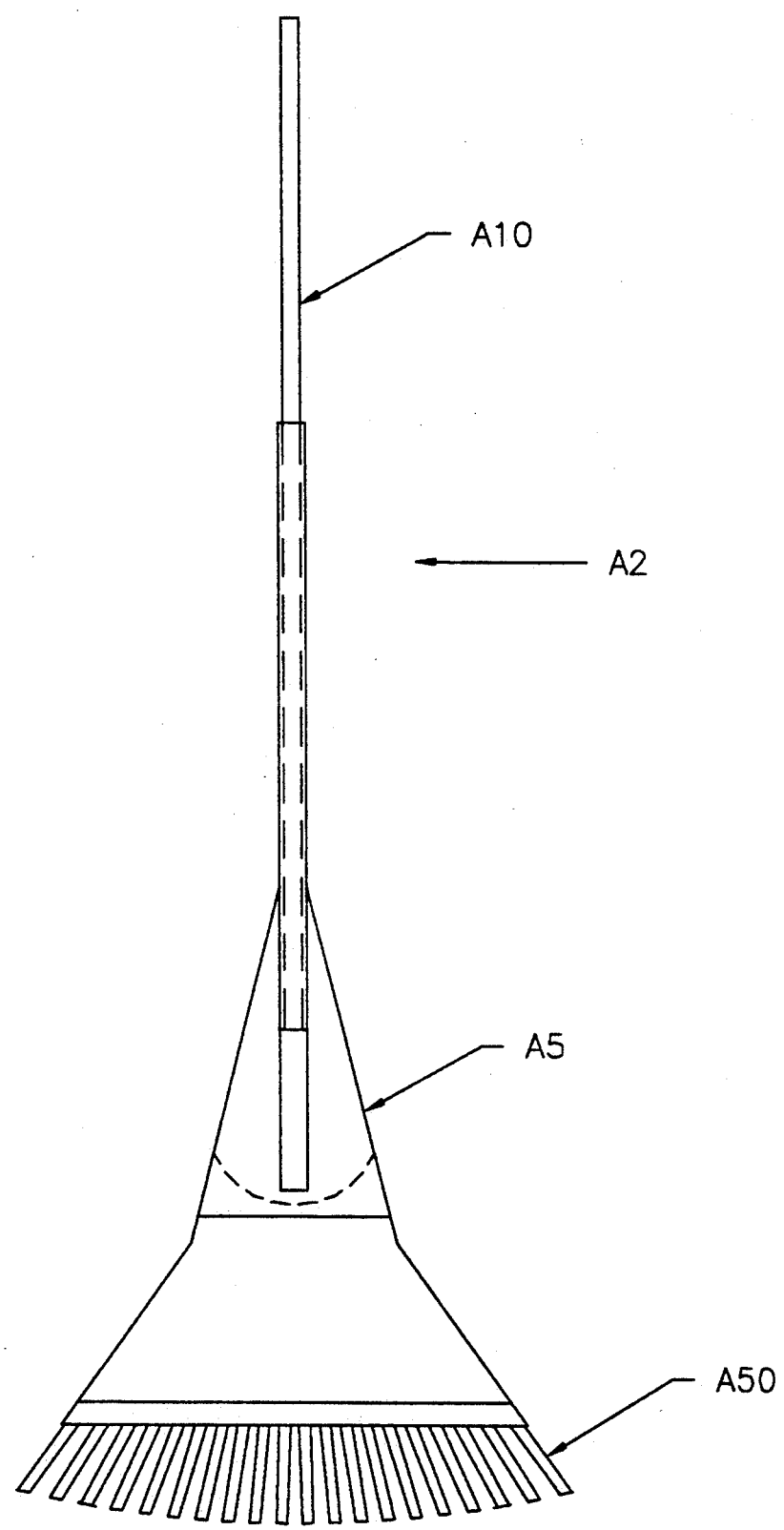
FIG. 7 is a top view of the molded plastic version of the lawn rake with the cleaning apparatus in the customary position for raking.
Figure 8:
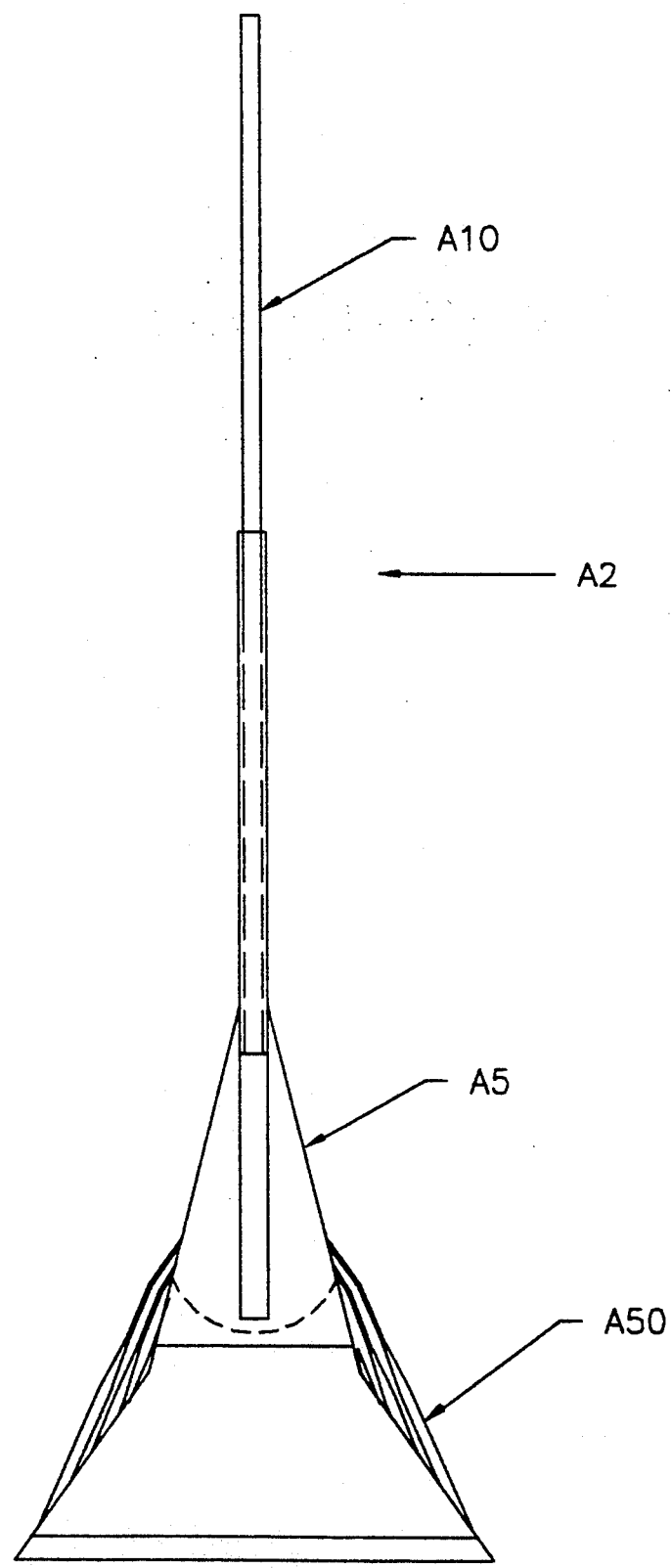
FIG. 8 is a top view of the molded plastic version of the lawn rake with the cleaning apparatus fully extended as in the act of cleaning.
Figure 9:
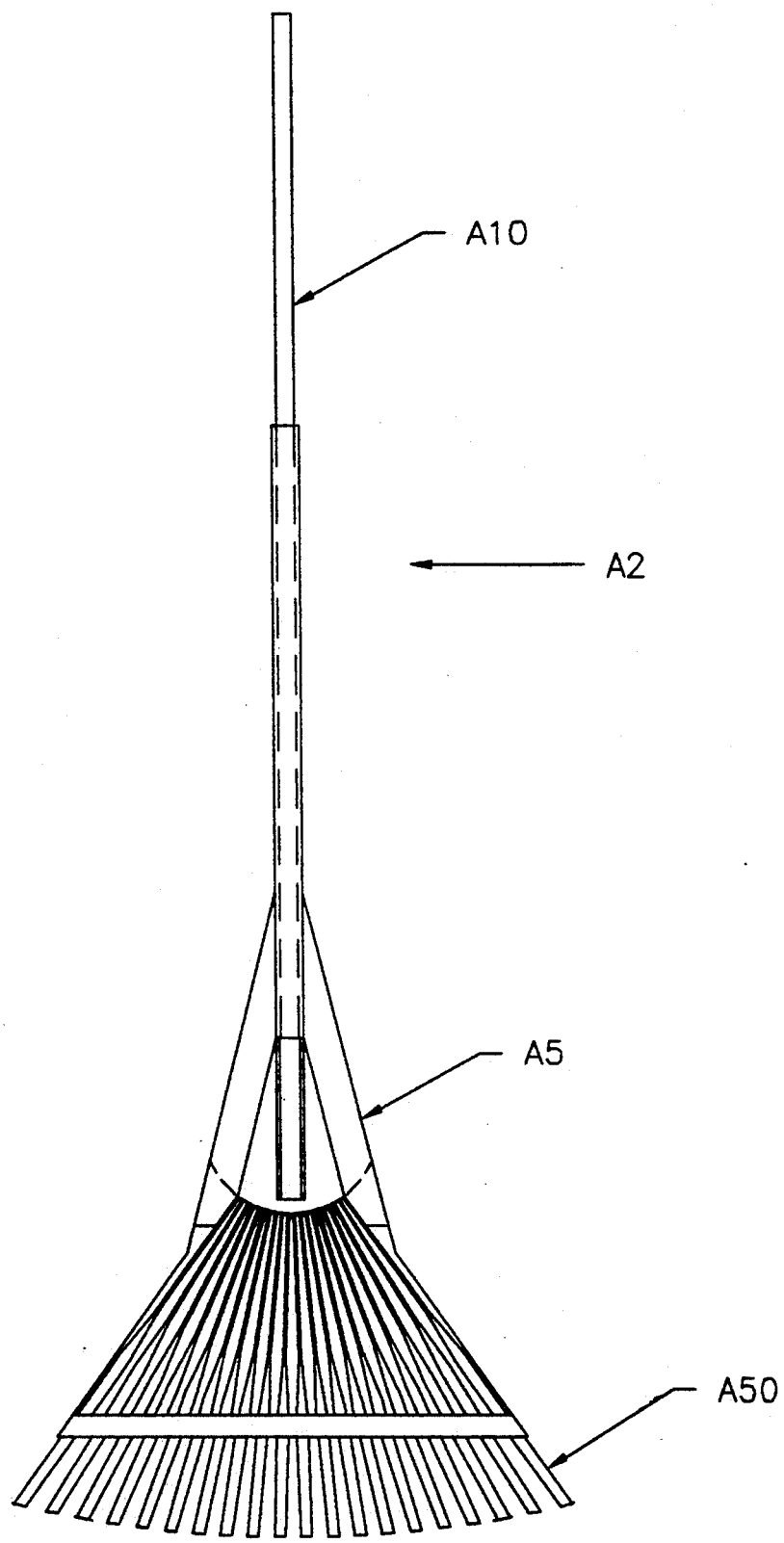
FIG. 9 is a bottom view of the molded plastic version of the lawn rake.
Figure 10:
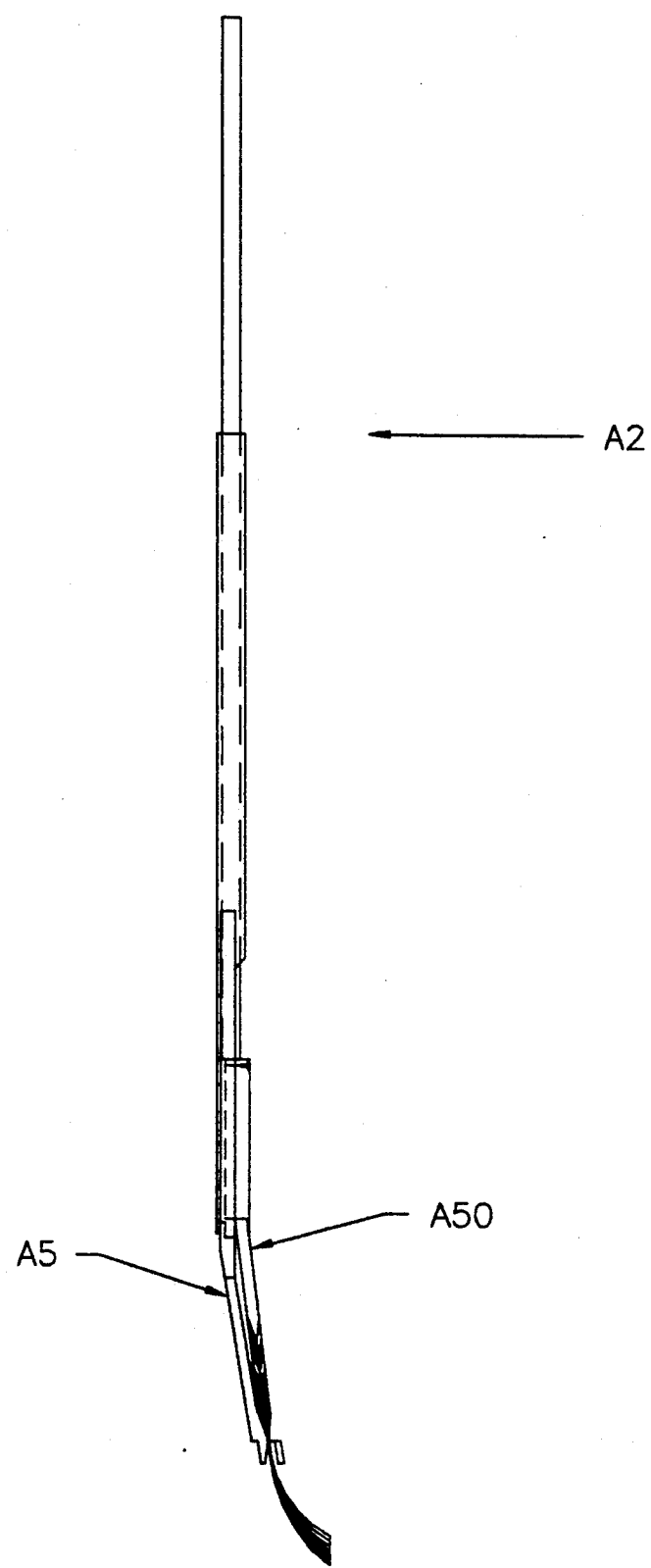
FIG. 10 is a side view of the molded plastic version of the lawn rake.
Figure 11:
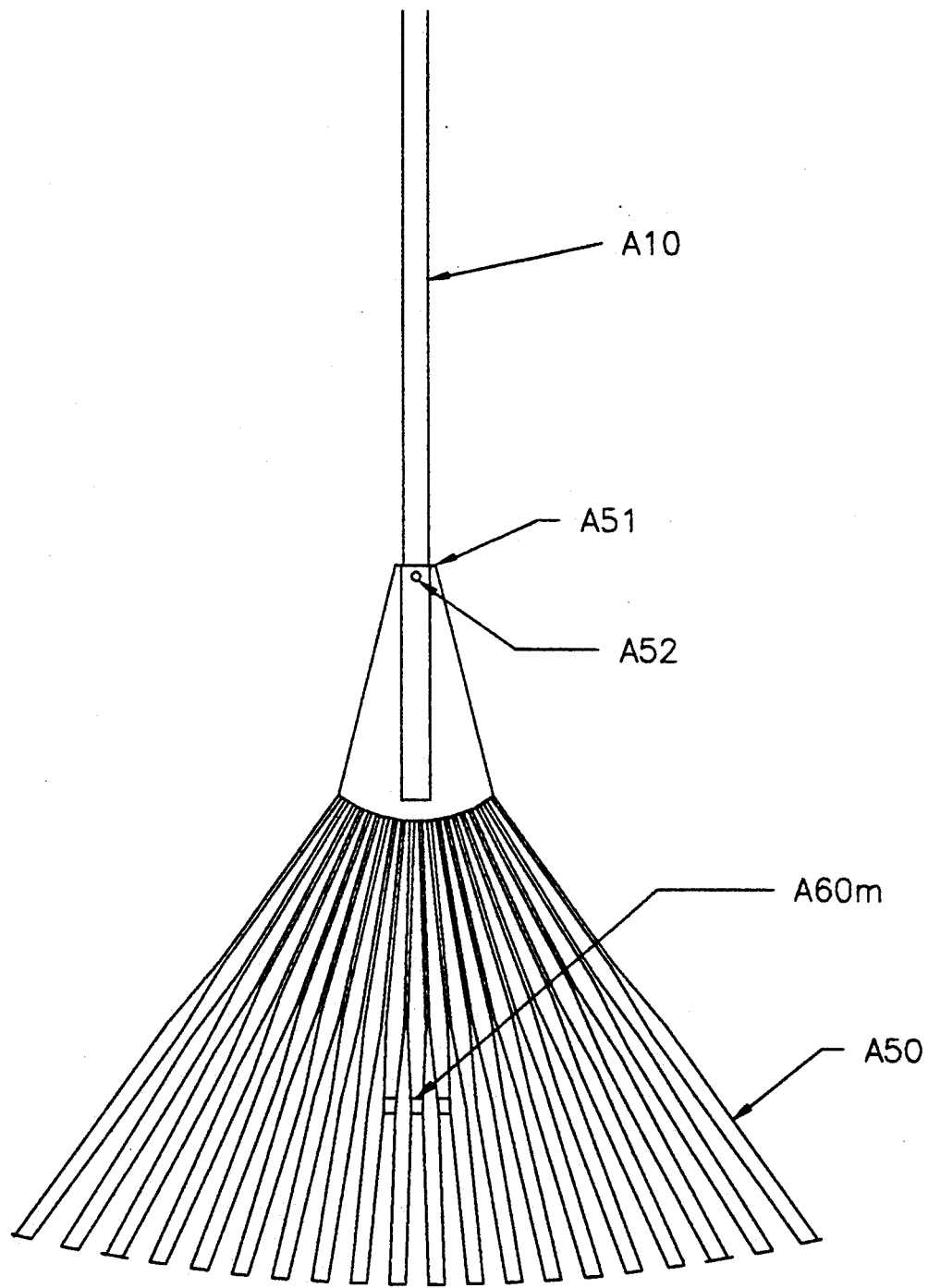
FIG. 11 is an enlarged view of the molded plastic rake head assembly.
Figure 12:
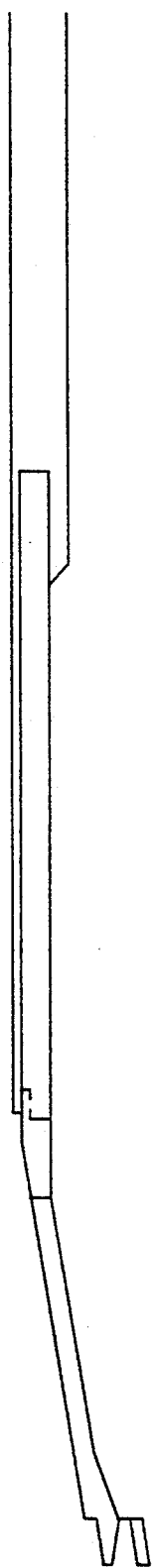
FIG. 12 is a side view of the molded plastic cleaning apparatus.

An instance of an alternate embodiment is shown in FIGS. 7 through 12. FIGS. 7 and 8 show a molded plastic version of the lawn rake A2 in the raking and cleaning positions respectively. The cleaning apparatus A5 is monolithic construction of molded plastic, and comprises all the functions of the cleaning apparatus 5 detailed above. FIG. 9 shows the bottom view of a molded plastic version of the lawn rake A2. FIG. 10 is a side view of such a rake, showing the cleaning apparatus A5, handle A10, and the rake head assembly A50. FIG. 11 is a detail of a molded plastic version of the rake head assembly A50 and comprises all the functions of the rake head 50, fastener 54, and tines 60 listed above in its monolithic molded plastic shape. In addition, it includes a formed bridge between the middle four tines A60m to act as a stop for the return of the cleaning apparatus to its proximal position. The stop A51 for the distal extension of said cleaning apparatus is integrally formed with the rake head assembly A50 which is attached to a handle A10 by mechanical fasteners A52. FIG. 12 is a side view of a monolithically molded plastic cleaning apparatus A5.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An implement for raking comprising:
   a. a raking apparatus for gathering debris comprising:

1) an elongated handle which allows the longitudinal movement of a cleaning apparatus along and about a distal section of said handle, a distal end of said handle being inserted into;
2) a formed elongated socket of a rake head and secured by a fastener which holds a bumper against which a bottom distal end of an elongated hollow actuator comes to rest, said rake head binding;
3) a plurality of downward diverging tines at their proximal ends, said tines being oriented in parallel planes, perpendicular to a rake top and being twisted 90 degrees about their longitudinal axes at a point equidistant from the rake head for each tine, before extending coplanar and passing through a plurality of slots in a cleaning bar, thence arcing downward to terminate in a common plane, said tines being of such length as to each terminate between a distal top and bottom edge of said cleaning bar when said cleaning bar is fully distally extended;
4) said raking apparatus supporting said cleaning apparatus:

b. said cleaning apparatus for removing debris lodged in the tines of said raking apparatus and comprising
1) the elongated hollow actuator, with a bottom distal portion removed to allow said actuator to be slid freely along the distal section of the handle and over the rake head, said actuator being attached at a top distal end of said actuator to;
2) a proximal end of a spring, a distal end of said spring being attached to and applying tension downward along;
3) a cleaning bar, also acting as a stress distributor and tine spreader which transverses and through which pass the downward diverging tines, said cleaning bar being of inverted V shape cross section with said plurality of slots arranged end to end along an apex to admit the individual tines and with the distal top and bottom edge diverging from each other, said top and bottom edge for removing accumulated debris which becomes lodged in the tines, as said cleaning bar is moved freely down the length to the end of said tines as the actuator is moved toward a distal end of the raking apparatus;
4) said cleaning apparatus being stopped in its travel toward the distal end of the raking apparatus by contact of the actuator bottom distal end with said bumper;
5) and upon its return travel by contact with a stop integral with the raking apparatus.

2. The implement for raking in claim 1 with the elongated handle of the raking apparatus such that a proximal section is of greater diameter than the distal section of said handle to allow the longitudinal movement of the cleaning apparatus along said distal section and so that said cleaning apparatus is stopped upon its proximally directed travel by contact with the proximal section of greater diameter of said handle.

3. The implement for raking in claim 1 with an elongated slot in the elongated hollow actuator which encompasses a two way bumper which is integrated with the rake handle such that a proximal end of the slot comes in contact with a proximal side of said two way bumper stopping its motion at a distal end of the travel of the cleaning apparatus and such that a distal end of the slot comes in contact with a distal side of said two way bumper stopping its motion at a proximal end of the travel of said cleaning apparatus.

4. The implement for raking in claim 1 with the cleaning apparatus made of monolithic molded plastic.

5. The implement for raking in claim 1 with the tines made of spring steel.

6. The implement for raking in claim 1 with the rake head and tines made of monolithic molded plastic and with the cleaning apparatus made of monolithic molded plastic.

7. The implement for raking in claim 1 with said actuator attached at the top distal end to a coil spring, so as to maintain longitudinal alignment of the coil spring with the longitudinal axis of said actuator, two prongs of said coil spring diverging from the actuator and extending downward where they terminate in a bend that attaches to, activates and applies tension along the cleaning bar.

8. The implement for raking in claim 1 with the diverging tines of such a tension as to maintain the cleaning apparatus generally at the proximal end of its travel during handling of the implement once so positioned by the operator and with the spring of the cleaning apparatus and a downward arc of the tines of such a tension to maintain said cleaning apparatus generally at the distal end of its travel during handling of the implement once so positioned by the operator.

9. The implement for raking in claim 1 with a leaf spring attached to the proximal section of the handle to receive and hold the actuator at the proximal end of its travel once so positioned by the operator, but requiring no release of the operators grip from either the actuator or handle in order to move the cleaning apparatus toward the distal end of its travel.

10. The implement for raking in claim 1 with the cleaning bar formed in an arc, ends of said bar being closer to the distal end of the raking apparatus than the middle of said bar, such that when the cleaning apparatus is fully distally extended, the distal ends of the tines terminate at the distal edge of said cleaning bar, and such that when the cleaning apparatus is fully proximally returned to its position for raking, the distal ends of the tines terminate in a common, straight line.

* * * * *